(12) United States Patent
Hsieh et al.

(10) Patent No.: US 6,915,762 B2
(45) Date of Patent: Jul. 12, 2005

(54) WALL-MOUNTABLE AQUARIUM

(75) Inventors: Han Chang Hsieh, Suzhou (CN); Xiao Hong Liu, Suzhou (CN)

(73) Assignee: Suzhou Good View Aquaria Technology Co., Ltd., Suzhou (CN)

( * ) Notice: Subject to any disclaimer, the term of this patent is extended or adjusted under 35 U.S.C. 154(b) by 0 days.

(21) Appl. No.: 10/658,489

(22) Filed: Sep. 8, 2003

(65) Prior Publication Data

US 2005/0051107 A1 Mar. 10, 2005

(51) Int. Cl.[7] .............................................. A01K 63/00
(52) U.S. Cl. ...................................................... 119/257
(58) Field of Search ................................. 119/257, 253, 119/245, 416, 452, 417, 247, 269, 246, 264

(56) References Cited

U.S. PATENT DOCUMENTS

| | | | | |
|---|---|---|---|---|
| 43,062 A | * | 6/1864 | Ronneburg | 119/257 |
| 1,777,944 A | * | 10/1930 | Trovato | 119/257 |
| 1,974,068 A | * | 9/1934 | Greensaft | 119/257 |
| 2,144,551 A | * | 1/1939 | Skolnick | 119/257 |
| 2,814,895 A | * | 12/1957 | Flam | 119/257 |
| 3,276,428 A | * | 10/1966 | Burch | 119/257 |
| 3,730,138 A | * | 5/1973 | Suchowski | 119/253 |
| 3,735,738 A | * | 5/1973 | Lake | 119/257 |
| 4,313,048 A | * | 1/1982 | Holbrook | 119/245 |
| 4,353,327 A | * | 10/1982 | Shroyer | 119/257 |
| 5,090,358 A | * | 2/1992 | Waldman | 119/257 |
| 6,415,739 B1 | * | 7/2002 | Orendorff et al. | 119/248 |

FOREIGN PATENT DOCUMENTS

CN          01218362.8          6/1999

\* cited by examiner

*Primary Examiner*—Son T. Nguyen
(74) *Attorney, Agent, or Firm*—Merchant & Gould P.C.

(57) ABSTRACT

A wall-mountable aquarium has a slim tank for containing water to keep living aquatic animals or plants. The tank includes a transparent front wall, a rear wall, opposite left and right side walls and a bottom wall, with the side and bottom walls being considerably narrower than the front and rear walls. A fixed enclosure is provided externally on at least one of the left and right side walls and bottom wall for containing part of accessory for the aquarium. A frame is attached on the front wall, which conceals the enclosure from direct sight from the front and includes a see-through portion therein to reveal only the living habitat inside the tank through the front wall.

6 Claims, 4 Drawing Sheets

WALL-MOUNTABLE AQUARIUM

The present invention relates to an aquarium or fish tank for keeping living animals or plants, which is designed for use on a wall.

BACKGROUND OF THE INVENTION

It is known that aquariums can be mounted on a wall, for example as disclosed in Chinese Patent No. 01218362.8. However, the aquarium of this publication has a complicate multi-layered structure expensive to manufacture, and is heavy and therefore difficult to mount on a wall.

The invention seeks to mitigate or at least alleviate such problems by providing an improved wall-mountable aquarium.

SUMMARY OF THE INVENTION

According to the invention, there is provided a wall-mountable aquarium comprising a slim tank for containing water to keep living aquatic animals or plants. The tank includes a transparent front wall, a rear wall, opposite left and right side walls and a bottom wall, with the side and bottom walls being considerably narrower than the front and rear walls. A fixed enclosure is provided externally on at least one of the left and right side walls and bottom wall for containing part of accessory for the aquarium. Also included is a frame attached on the front wall, which conceals the enclosure from direct sight from the front and includes a see-through portion therein to reveal only the living habitat inside the tank through the front wall.

Preferably, the enclosure is provided on at least one of the left and right side walls.

More preferably, the front and rear walls extend laterally beyond said side wall to form the enclosure.

In a preferred embodiment, the enclosure is provided on each of the left and right side walls.

More preferably, the front and rear walls extend laterally in opposite directions beyond the side walls to form the respective enclosures.

Preferably, the enclosure opens laterally and is closed by a separate cover.

It is preferred that the accessory includes a water heater provided in the tank and a controller for controlling the heater to operate and keep the water in the tank at a presettable constant temperature, the controller being housed in the enclosure.

It is preferred that the accessory includes a filtering trough located at the top of the tank, a grate lying on the bottom wall, a water pump, and a pipe extending from the pump to reach above the trough. Water is deliverable by the pump from the bottom of the tank via the pipe into the trough atop for filtering and then flowing back down into the tank. The trough and the grate are concealed by the frame from direct sight from the front.

It is further preferred that the pump is provided inside the tank and adjacent the grate such that it is also concealed by the frame from direct sight from the front, and the pipe extends along a corner of the tank upwardly out of water to reach above the trough.

It is further preferred that the trough has a bottom wall having small drain holes, and includes a lateral exit to allow overflow of water back into the tank.

Preferably, the accessory includes an aquarium lamp located at the top of the tank, the lamp being concealed by the frame from direct sight from the front.

Preferably, the accessory includes a background sheet fixed inside the tank close to and covering the rear wall.

More preferably, the background sheet extends also close to and covering the left and right side walls, turning smoothly round the corners between the walls.

BRIEF DESCRIPTION OF DRAWINGS

The invention will now be more particularly described, by way of example only, with reference to the accompanying drawings, in which.

DETAILED DESCRIPTION OF PREFERRED EMBODIMENT

Figure 1:
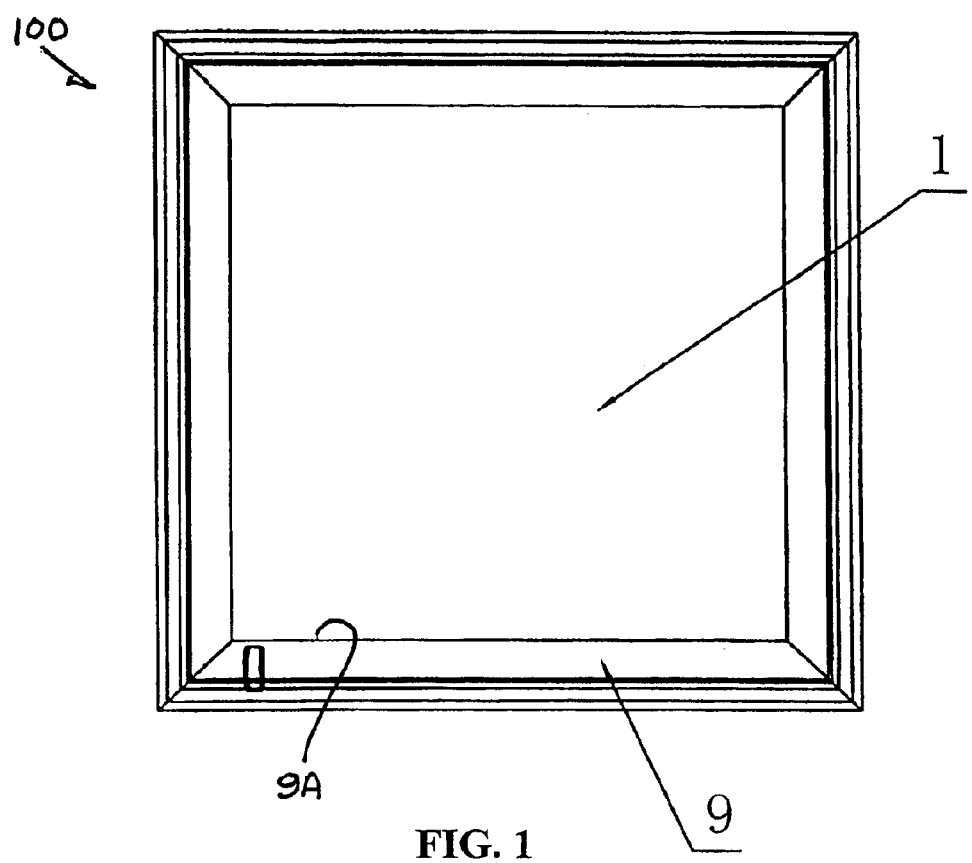
FIG. 1 is a front view of an embodiment of an aquarium in accordance with the invention.
Figure 2:
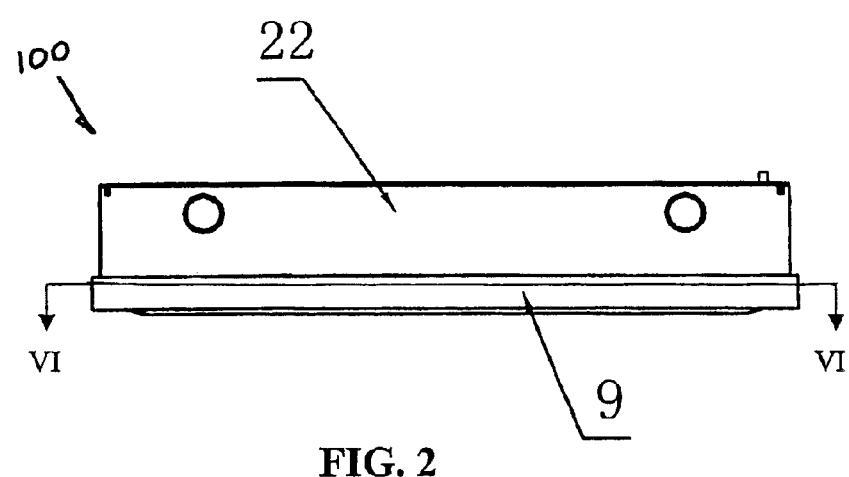
FIG. 2 is a top plan view of the aquarium of FIG. 1.
Figure 3:
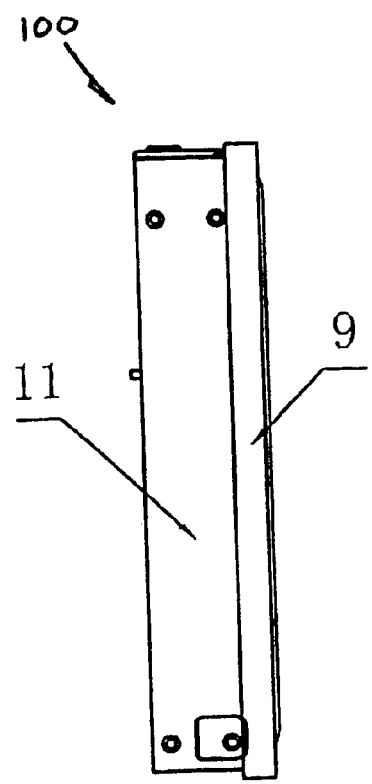
FIG. 3 is a left side view of the aquarium of FIG. 1.
Figure 4:
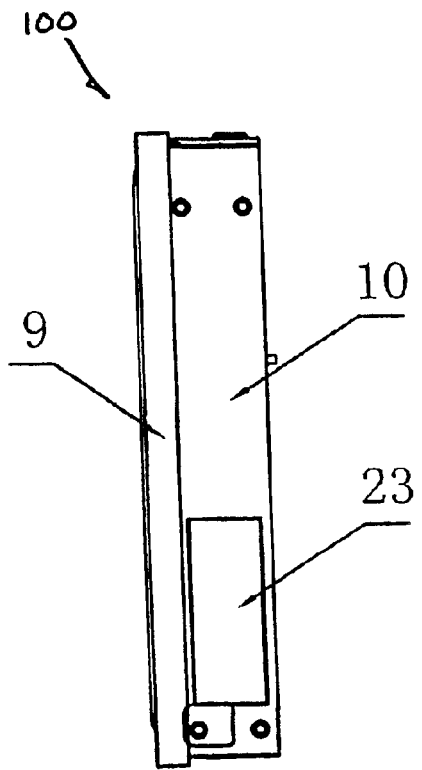
FIG. 4 is a right side view of the aquarium of FIG. 1.

Referring to the drawings, there is shown a wall-mountable aquarium 100 embodying the invention, which includes an integrally moulded plastic tank 1 of a slim rectangular structure for containing water to keep living aquatic animals or plants. The tank 1 has a transparent front wall 5, left and right side walls 6 and 7, a rear wall 8 and a bottom wall 14, with the left and right side walls 6 and 7 being considerably narrower than the front and rear walls 5 and 8. A top lid 22 normally closes the tank 1.

The front, rear and bottom walls 5, 8 and 14 extend laterally outwards in opposite directions beyond the side walls 6 and 7. Such extensions, together with a flange 6A/7A that extends outwards from the top end of each side wall 6/7 and across the front and rear walls 5 and 8, define a laterally-open shallow cavity on the side wall 6/7. The cavities are closed by separate oblong covers 11 and 10, whereby two fixed enclosures E1 and E2 are formed on the corresponding side walls 6 and 7 for housing part of accessory for the aquarium 100, such as a water temperature controller 18 in the right enclosure E2. It is possible that a similar enclosure may be formed on the bottom side of the tank 1.

The aquarium 100 includes a square frame 9 attached onto and extending over the entire front wall 5, which conceals both enclosures E1 and E2 and the top and bottom parts of the tank from direct sight from the front. The frame 9 has a central opening 9A, across which a see-through glass pane may be fitted, revealing only the living habitat inside the tank 1 through the front wall 5. A peripheral flange 9B of the frame 9 fits around the frontmost part including the front wall 5 of the tank 1, so that the frame 9 can easily be fixed and aligned in position. The frame 9 may be made in any decorative design such as a picture frame as shown.

The accessory for the aquarium 100 includes a water circulation and filter system, a water temperature control system, an aquarium lamp and background setting.

The circulation and filter system incorporates a filtering trough 19, a grate 16, a water pump 15 and a pipe 12. The trough 19 is located within the top part of the tank 1, above the water contained therein. The grate 16 lies flat on the bottom of the tank 1. The pump 15 is submerged and placed inside or underneath a left end portion of the grate 16. The trough 19 is hidden behind the top member of the frame 9, whereas the grate 16 and pump 15 are hidden behind the bottom frame member.

The pump 15 has an inlet at the grate 16 and an outlet from which the pipe 12 extends vertically upwards out of water to reach above the trough 19. The pipe 12 is located in a corner of the tank 1 between the left and rear walls 6 and 8, extending upwardly along that corner.

Upon operation, the pump 15 delivers water from the bottom of the tank 1 upward via the pipe 12 into the trough 19. The trough 19 contains filtering material, through which water runs for filtering and then flows back down into the tank 1 via an array of small drain holes 25 at the bottom wall of the trough 19. A relatively shorter end wall 20 of the trough 19 acts as a lateral exit to allow overflow of water back into the tank 1 through a return hole 21 provided just outside the wall 20. As water is circulated into and out of the rough 19 for cleaning, it is agitated and exposed to air and is therefore thus aerated.

The temperature control system is implemented by a heater rod 17 controlled by the controller 18 to operate and keep the water in the tank 1 at a presettable constant temperature. The heater rod 17 is located horizontally inside or underneath the grate 16, also hidden behind the bottom member of the frame 9. An electric cable connects the heater rod 17 to the controller 18 for power supply and control, which runs through a vertical conduit 13. The controller 18 includes a turning knob 18A outside the right cover 10. The conduit 13 is located in a corner of the tank 1 between the right and rear walls 7 and 8, extending upwardly along that corner.

The lamp is provided a florescent tube 24 that is located to extend horizontally within the top part of the tank 1 behind and alongside the filtering trough 19. The tube 24 is therefore also hidden behind the top member of the frame 9.

Most parts of the aquarium accessory are conveniently housed within the top and bottom parts and on the left and right sides of and around the tank 1, at such locations that are concealed by the frame 9 from direct sight from the front. The frame 9 reveals only the living habitat inside the tank 1. The resulting aquarium 100 has an all-in-one neat and tidy structure and, given its slim design, is particularly suitable and intended for use on a wall by using any appropriate mounting means such as wall brackets.

It is envisaged that the pump 15 and pipe 12 can be used outside the tank 1, for example if a more powerful pump is needed, in which case they can be housed inside the left enclosure E1.

The background setting is provided by a water-resistant, plastic sheet 2 printed with a background scenery, typically an undersea scene including coral and plants for example. The sheet 2 is submerged in water and is located by its bottom edge inserted in an upwardly-open fixing groove 3 formed on or in the upper surface of the bottom grate 16. The groove 3 is continuous as shown or may be discontinuous. It extends from the front left tank corner and close to the left wall 6, then turns smoothly to the rear wall 8 and extends therealong, then turns smoothly to the right wall 7 and extends close thereto, and finally terminates at the front right tank corner.

With its bottom edge held by and running along the groove 3, the sheet 2 adopts substantially the same profile to cover generally the entire rear wall 8 and both side walls 6 and 7. The sheet 2 turns smoothly round the corners between the walls 6, 8 and 7 and completely conceals the pipe 12 and conduit 13.

Figure 7:
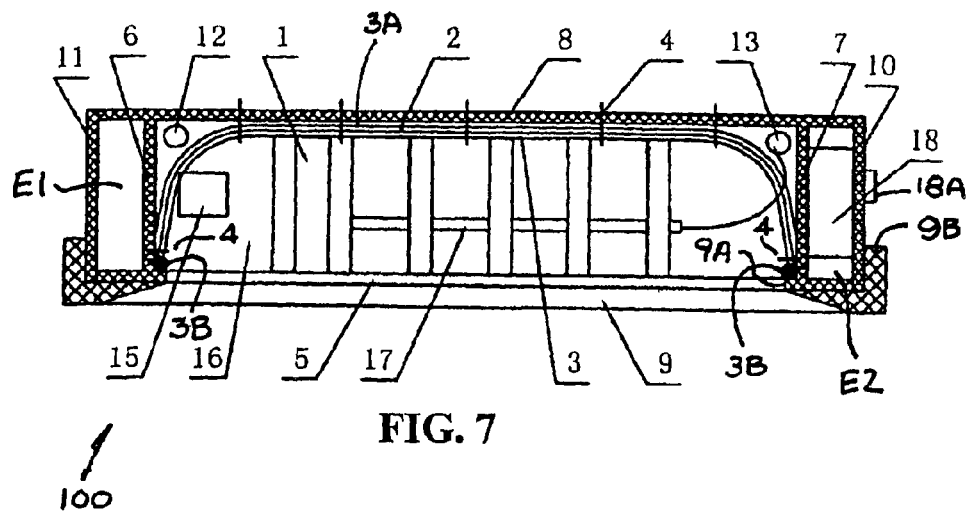
FIG. 7 is a cross-sectional view of the aquarium of FIG. 6, taken along line VII—VII.
Figure 8:
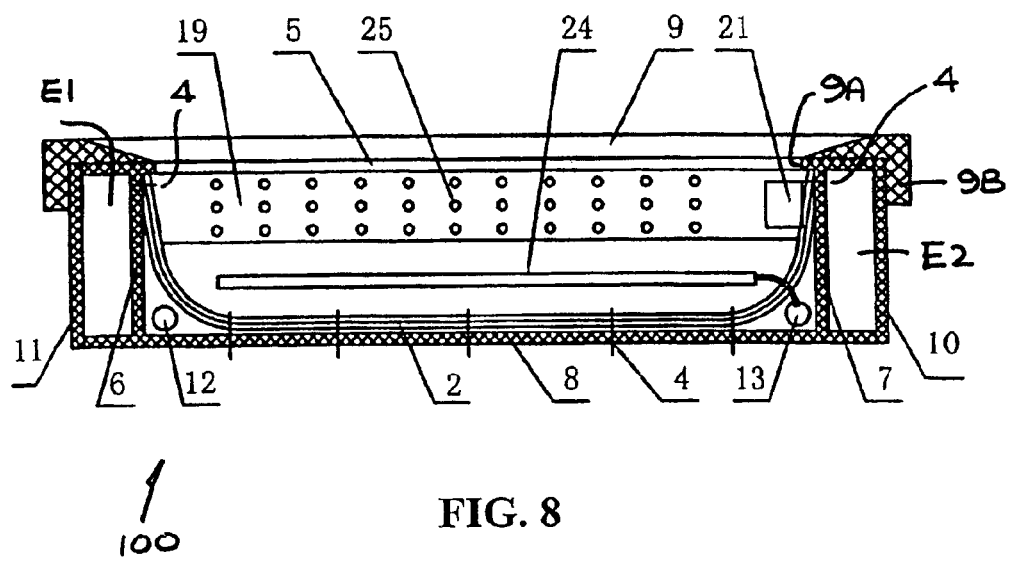
FIG. 8 is a cross-sectional plan view of the aquarium of FIG. 1, taken along line VIII—VIII.

The sheet 2 has seven small holes along its top edge for fixing in position by respective suction cups 4 (only schematically shown in FIGS. 7 and 8), with each cup 4 having an integral stud engaging through the corresponding hole like a rivet. Five of the suction cups 4 are attached on the inner surface of the rear wall 8, and the other two at opposite top corners attached to the left and right side walls 6 and 7. The sheet 2 can easily be set free by simply pulling it off the suction cups 4, whereupon it can be removed for cleaning or replacement by another sheet bearing a different background scenery.

By extending smoothly over the entire rear wall 8 and both side walls 6 and 7, the sheet 2 provides a panoramic wide-screen background scene for enhancing visual effect. The sheet 2 is submerged directly in water to maximise visibility through the front tank wall 5 only and to avoid obscuring by unwanted substance such as moisture or dust, compared with the case where the sheet is located behind the tank or in a double-walled support inside the tank.

The background sheet 2 may be fixed in a number of other ways. In a preferred alternative, a removable mount 3A is used to fixedly support the sheet 2 thereon before they are positioned inside the tank 1. The mount 3A takes the form of a plate or frame that is bent or formed to have the aforesaid profile for extending over the rear and side tank walls 8, 6 and 7, i.e. having a planar middle section and opposite left and right side sections curved smoothly therefrom. The mount 3A may be located by fixing slots (not shown) provided on the left and right side walls 6 and 7, for example.

In another preferred alternative, the background sheet 2 has opposite ends that are wound on a pair of scroll rollers 3B. The rollers 3B are positioned vertically within opposite left and right sides within the tank 1, locating the sheet 2 across them to display the background scenery. The sheet 2 has its top and bottom edges engaged by respective fixing grooves 3, for example, to adopt the aforesaid profile extending over the rear and side tank walls 8, 6 and 7. More than one scenery may be printed on the sheet 2, in which case the background can easily be changed from one scenery to another by simply rotating the rollers 3B.

The invention has been given by way of example only, and various other modifications of and/or alterations to the described embodiment may be made by persons skilled in the art without departing from the scope of the invention as specified in the appended claims.

What is claimed is:

1. A wall-mountable aquarium, comprising:

a slim tank for containing water to keep living aquatic animals or plants, the tank including a transparent front wall, a rear wall, opposite left and right side walls and a bottom wall, with the side and bottom walls being considerably narrower than the front and rear walls, a fixed enclosure provided externally on at least one of the left and right side walls and bottom wall for containing a part of an accessory for the aquarium, and a frame attached on the front wall, the frame concealing the enclosure from direct sight from the front and including a see-through portion therein to reveal only the living habitat inside the tank through the front wall, the part of the accessory including a filtering trough located at the top of the tank, a grate lying on the bottom wall, a water pump, and a pipe being concealed by a background setting of the accessory, the background setting being a sheet extending along a width of the rear wall and in front of the pipe, the pipe extending from the pump to reach above the trough, water is deliverable by the pump from the bottom of the tank via the pipe into the trough atop for filtering and then flowing back down into the tank, the trough and the grate being concealed by the frame from direct sight from the front, and an upwardly-open fixing groove formed on an upper surface of the grate, the fixing groove being disposed in front of the pipe, wherein the sheet is located by a bottom edge thereof and inserted in said fixing groove.

2. The wall-mountable aquarium as claimed in claim 1, wherein the background sheet is fixed inside the tank close to and covering the rear wall.

3. The wall-mountable aquarium as claimed in claim 2, wherein the background sheet extends also close to and covering the left and right side walls, turning smoothly round the corners between the walls.

4. A wall-mountable aquarium, comprising:

a slim tank for containing water to keep living aquatic animals or plants, the tank including a transparent front wall, a rear wall, opposite left and right side walls and a bottom wall, with the side and bottom walls being considerably narrower than the front and rear walls, a fixed enclosure provided externally on at least one of the left and right side walls and bottom wall for containing a part of an accessory for the aquarium, and a frame attached on the front wall, the frame concealing the enclosure from direct sight from the front and including a see-through portion therein to reveal only the living habitat inside the tank through the front wall, the part of the accessory including a filtering trough located at the top of the tank, a grate lying on the bottom wall, a water pump, and a pipe being concealed by a background setting of the accessory, the background setting being a sheet extending along a width of the rear wall and in front of the pipe, the pipe extending from the pump to reach above the trough, water is deliverable by the pump from the bottom of the tank via the pipe into the trough atop for filtering and then flowing back down into the tank, the trough and the grate being concealed by the frame from direct sight from the front, the pump is provided inside the tank and adjacent the grate such that it is also concealed by the frame from direct sight from the front, and the pipe extends along a corner of the tank upwardly out of the water to reach above the trough, and an upwardly-open fixing groove formed on an upper surface of the grate, the fixing groove being disposed in front of the pipe, wherein the sheet is located by a bottom edge thereof and inserted in said fixing groove.

5. A wall-mountable aquarium, comprising:

a slim tank for containing water to keep living aquatic animals or plants, the tank including a transparent front wall, a rear wall, opposite left and right side walls and a bottom wall, with the side and bottom walls being considerably narrower than the front and rear walls, a fixed enclosure provided externally on at least one of the left and right side walls and bottom wall for containing a part of an accessory for the aquarium, and a frame attached on the front wall, the frame concealing the enclosure from direct sight from the front and including a see-through portion therein to reveal only the living habitat inside the tank through the front wall, the part of the accessory including a filtering trough located at the top of the tank, a grate lying on the bottom wall, a water pump, and a pipe being concealed by a background setting of the accessory, the background setting being a sheet extending along a width of the rear wall and in front of the pipe, the pipe extending from the pump to reach above the trough, whereby water is deliverable by the pump from the bottom of the tank via the pipe into the trough atop for filtering and then flowing back down into the tank the trough and the grate being concealed by the frame from direct sight from the front, wherein the trough has a bottom wall having small drain holes, and includes a lateral exit to allow overflow of water back into the tank, and an upwardly-open fixing groove formed on an upper surface of the grate, the fixing groove being disposed in front of the pipe, wherein the sheet is located by a bottom edge thereof and inserted in said fixing groove.

6. A wall-mountable aquarium, comprising:

a slim tank for containing water to keep living aquatic animals or plants, the tank including a transparent front wall, a rear wall, opposite left and right side walls and a bottom wall, with the side and bottom walls being considerably narrower than the front and rear walls, a fixed enclosure provided externally on at least one of the left and right saide walls and bottom wall for containing part of an accessory for the aquarium, and a frame attached on the front wall, the frame concealing the enclosure from direct sight from the front and including a see-through portion therein to reveal only the living habitat inside the tank through the front wall, the accessory includes a background setting fixed inside the tank close to and covering the rear wall and the background setting being a sheet that extends close to and covering the left and right side walls, turning smoothly round the corners between the walls, and an upwardly-open fixing groove formed on an upper surface proximate the bottom wall of the tank, the fixing groove being disposed in front of the pipe, wherein the sheet is located by a bottom edge thereof and inserted in said fixing groove.

* * * * *

UNITED STATES PATENT AND TRADEMARK OFFICE
CERTIFICATE OF CORRECTION

PATENT NO. : 6,915,762 B2
DATED : July 12, 2005
INVENTOR(S) : Hsieh et al.

It is certified that error appears in the above-identified patent and that said Letters Patent is hereby corrected as shown below:

Title page,
Item [56], References Cited, U.S. PATENT DOCUMENTS, insert the following:
-- 5,427,060 A  *   6/1995    Kikuta
   4,151,810 A  *   5/1979    Wiggins
   5,435,270 A  *   7/1995    Newman
   5,921,203 A  *   7/1999    Gibbs --.

Column 1,
Line 26, "containing part of accessory for" should read -- containing part of an accessory for --.

Figure 5:
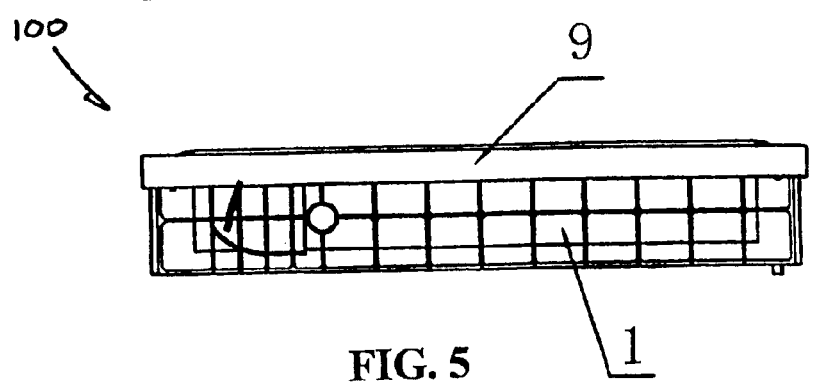
FIG. 5 is a bottom plan view of the aquarium of FIG. 1.
Figure 6:
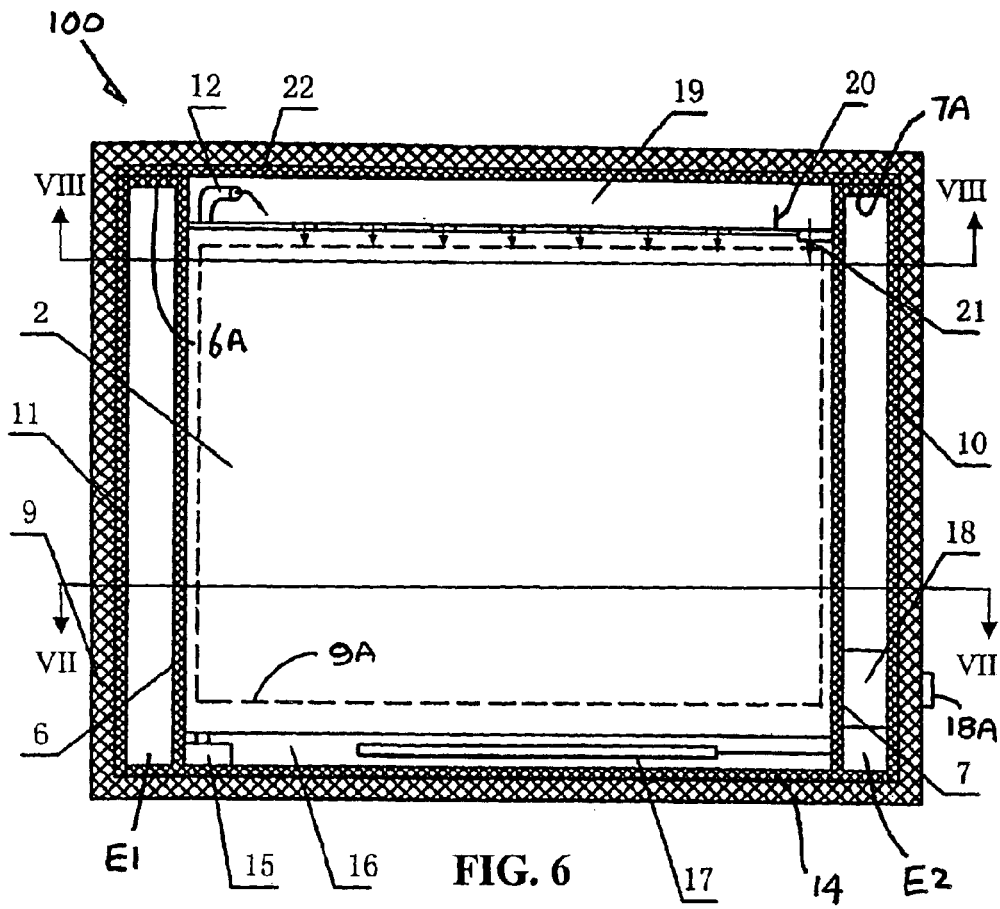
FIG. 6 is a cross-sectional view of the aquarium of FIG. 2, taken along line VI—VI.

Column 2,
Lines 16-17, "FIG. 5 is a bottom" should start a new paragraph.
Line 24, "FIG. 1 taken along" should read -- FIG. 6 taken along --.
Lines 31-32, "of a slim rectangular structure" should read -- of a slim square or rectangular structure --.
Lines 46-47, "housing part of accessory for" should read -- housing part of an accessory for --.

Column 3,
Lines 21-22, "rough 19 for cleaning, it is agitated and exposed to air and is therefore thus aerated." should read -- trough 19 for cleaning, it is agitated and exposed to air and is therefore aerated --.

Column 6,
Line 22, "into the tank the trough and the" should read -- into the tank, the trough and the --.

Signed and Sealed this

Thirty-first Day of January, 2006

JON W. DUDAS
*Director of the United States Patent and Trademark Office*